(12) United States Patent
Huang et al.

(10) Patent No.: US 7,878,056 B2
(45) Date of Patent: Feb. 1, 2011

(54) MICROMACHINED THERMAL MASS FLOW SENSOR WITH SELF-CLEANING CAPABILITY AND METHODS OF MAKING THE SAME

(75) Inventors: Liji Huang, San Jose, CA (US);
Chih-Chang Chen, Cupertino, CA (US);
Yahong Yao, Milpitas, CA (US);
Gaofeng Wang, San Jose, CA (US)

(73) Assignee: Siargo Ltd., Santa Clara, CA (US)

( * ) Notice: Subject to any disclaimer, the term of this patent is extended or adjusted under 35 U.S.C. 154(b) by 0 days.

(21) Appl. No.: 11/960,261

(22) Filed: Dec. 19, 2007

(65) Prior Publication Data

US 2009/0158859 A1 Jun. 25, 2009

(51) Int. Cl.
*G01F 1/68* (2006.01)
(52) U.S. Cl. .................................................. 73/204.26
(58) Field of Classification Search .............. 73/204.22, 73/204.26
See application file for complete search history.

(56) References Cited

U.S. PATENT DOCUMENTS

| | | | | |
|---|---|---|---|---|
| 4,007,465 A * | 2/1977 | Chaudhary | ................... | 347/35 |
| 4,147,845 A * | 4/1979 | Petersen | ...................... | 521/56 |
| 4,478,076 A * | 10/1984 | Bohrer | ..................... | 73/204.16 |
| 4,478,077 A * | 10/1984 | Bohrer et al. | ............. | 73/204.26 |
| 4,501,144 A * | 2/1985 | Higashi et al. | ............. | 73/204.26 |
| 4,537,068 A * | 8/1985 | Wrobel et al. | ............. | 73/861.02 |
| 4,651,564 A * | 3/1987 | Johnson et al. | .......... | 73/204.26 |
| 4,696,188 A * | 9/1987 | Higashi | .................... | 73/204.19 |
| 4,902,138 A * | 2/1990 | Goeldner et al. | .............. | 374/44 |
| 4,909,078 A * | 3/1990 | Sittler et al. | ............. | 73/204.26 |
| 5,393,351 A * | 2/1995 | Kinard et al. | ................ | 136/225 |
| 6,620,712 B2 * | 9/2003 | Huang et al. | ................. | 438/519 |
| 6,684,694 B2 * | 2/2004 | Fujiwara et al. | .......... | 73/204.26 |
| 6,752,014 B1 * | 6/2004 | Kanke et al. | .............. | 73/204.15 |
| 6,781,735 B2 * | 8/2004 | Han et al. | .................... | 359/245 |
| 6,838,287 B2 * | 1/2005 | Bonne et al. | ................. | 436/149 |
| 6,858,284 B2 * | 2/2005 | Nun et al. | .................... | 428/149 |
| 6,871,538 B2 * | 3/2005 | Fujiwara et al. | .......... | 73/204.26 |
| 6,886,402 B2 * | 5/2005 | Kikuchi et al. | ........... | 73/204.25 |
| 7,040,160 B2 * | 5/2006 | Artmann et al. | .......... | 73/204.26 |
| 7,188,519 B2 * | 3/2007 | Hornung et al. | .......... | 73/204.26 |
| 7,255,001 B1 * | 8/2007 | Davis et al. | ............... | 73/204.26 |
| 7,395,707 B2 * | 7/2008 | Watanabe et al. | ........ | 73/204.26 |
| 7,536,908 B2 * | 5/2009 | Wang et al. | .............. | 73/204.26 |
| 7,673,508 B2 * | 3/2010 | Sakuma | ................... | 73/204.26 |
| 7,739,908 B2 * | 6/2010 | Wienand et al. | ......... | 73/204.26 |

(Continued)

*Primary Examiner*—Freddie Kirkland, III

(57) ABSTRACT

The current invention generally relates to Micro Electro Mechanical Systems (MEMS) thermal mass flow sensors for measuring the flow rate of a flowing fluid (gas/liquid) and the methods of manufacturing on single crystal silicon wafers. The said mass flow sensors have self-cleaning capability that is achieved via the modulation of the cavity of which the sensing elements locate on the top of the cavity that is made of a silicon nitride film; alternatively the sensing elements are fabricated on top of a binary silicon nitride/conductive polycrystalline silicon film under which is a porous silicon layer selective formed in a silicon substrate. Using polycrystalline silicon or the sensing elements as electrodes, an acoustic wave can be generated across the porous silicon layer which is also used for the thermal isolation of the sensing elements. The vibration or acoustic energy is effective to remove foreign materials deposited on top surface of the sensing elements that ensure the accuracy and enhance repeatability of the thermal mass flow sensing.

9 Claims, 7 Drawing Sheets

U.S. PATENT DOCUMENTS

| | | | |
|---|---|---|---|
| 7,752,910 B2 * | 7/2010 | Wang et al. | 73/204.26 |
| 7,765,679 B2 * | 8/2010 | Yao et al. | 29/611 |
| 2002/0110948 A1 * | 8/2002 | Huang et al. | 438/57 |
| 2004/0211253 A1 * | 10/2004 | Horie et al. | 73/204.15 |
| 2007/0011867 A1 * | 1/2007 | Yao et al. | 29/611 |
| 2007/0017285 A1 * | 1/2007 | Wang et al. | 73/204.26 |
| 2008/0271525 A1 * | 11/2008 | Wang et al. | 73/204.25 |
| 2009/0016403 A1 * | 1/2009 | Chen et al. | 374/45 |
| 2009/0049907 A1 * | 2/2009 | Wu et al. | 73/204.26 |
| 2009/0164163 A1 * | 6/2009 | Wang et al. | 702/100 |

* cited by examiner ic # MICROMACHINED THERMAL MASS FLOW SENSOR WITH SELF-CLEANING CAPABILITY AND METHODS OF MAKING THE SAME

BACKGROUND OF THE INVENTION

1. Field of the Invention

The present invention generally relates to thermal mass flow sensors on measuring the flow rate of flowing gas or liquid, more particularly; it concerns mass flow sensors which are made of Micro Electro Mechanical Systems (MEMS) approach and methods of manufacture. The present MEMS flow sensor is built on an active membrane or a porous silicon based device.

The active membrane or the porous silicon device is capable of generating a self-cleaning surface wave, such as ultrasonic acoustic wave emitted from porous silicon, on the active region of sensor surface. With the self-cleaning capability at the time of desire, the sensor itself would be able to work at environments with alien particles or debris from its active region. The sustained cleanness of active area on sensor surface could greatly enhance the flow measuring accuracy and retain its repeatability from calibration.

2. Description of the Related Art

Various micromachined gas and liquid mass flow sensors have been heretofore developed and commercially available on the market. One of the popular mass flow sensors, thermal mass flow sensor, is operated based on the principle of hot-wire anemometry or calorimetry. Compared to MEMS technology, the conventional technologies of mass flow sensors are constrained by the low flow uncertainties, small turn-down ratio on flow rate measurement, and high power consumption. In particular, the conventional thermal mass flow meters often become malfunction in a dirty fluid channel such as the fluid flow with smoke or dust in an electrical industrial environment. The malfunction of the meters lead to interruption of the manufacture and the sensors after liquid or dry cleaning may not have the same performance besides the installation deviations.

The US patents (Philip J. Bohrer and Robert G. Johnson, Flow Sensor, U.S. Pat. No. 4,478,077; Robert E. Higashi, Semiconductor device microstructure, U.S. Pat. No. 4,696,188) teach a typical MEMS type of thermal mass flow sensor generally comprised of a micro-machined membrane which is functioned as thermal isolation purpose to improve the accuracy of device operation. Therein the active region of membrane usually consists of heating elements and sensing elements such as resistance temperature detector (RTD) or thermopiles. However, this type of MEMS thermal flow sensor would have the following limitations:

(1) The thin film membrane is very fragile to be damaged and cause the device to malfunction frequently in a dusted or smoked fluid.
(2) The opening slots on the surface of membrane are constructed to block the heat conduction horizontally. However the open slots will also easily trapping the particles that may lead to the malfunction of the sensor.
(3) The opening slots on membrane will limit the application of flow sensor on liquid measurement because the filled liquid underneath the membrane will reduce the thermal resistance between membrane and the substrate to cause uncertainties.

The U.S. Pat. No. 7,040,160 (Flow Sensor; by Hans Artmann et al.) teaches a thermal flow sensor built on a region having poor heat conductivity of a silicon substrate. The region having poor heat conductivity is made of porous silicon or porous silicon dioxide. However, in the embodiment of this patent, the lateral thermal conductivity between the heater element and sensor components, unlike the current invention, is not totally isolated. The lateral heat conduction through the cover layer in Hans Artmann's invention can significantly reduce the measuring accuracy. Moreover, the location of the ambient temperature sensor to detect the environmental temperature for heater temperature control is either omitted or not specified explicitly in Hans Artmann's invention. To ensure the ambient temperature sensor having good thermal conductivity to the substrate is very crucial to prevent the temperature effect of thermal flow sensor. For the above reason, the ambient temperature sensor should not be disposed on the porous silicon region. A further limitation of the Artmann's approach is that the sensor would not work in a dust or dirty flow fluid as the surface of the sensor would cover by such to cause the malfunction.

It would be desirable, therefore, to provide an apparatus and method whereby the mass flow meter could work robustly in a dirty flow fluid without being disrupted for improved work efficiency. To this end, it would also be desirable that the sensors can perform self-cleaning periodically to maintain the flow meter accuracy and productivity. It is further desirable to have the sensing element of the sensors being well isolated, and ensure the environment temperature detection sensor well functioned.

Self-cleaning usually involved special surface coating (U.S. Pat. No. 4,147,845, Article having self-cleaning coating, by A. Nishino et al., and U.S. Pat. No. 6,858,284, Surface rendered self-cleaning by hydrophobic structures, and process for their production, by E. Nun et al.). However, in a dirty or smoked fluid flow, modification of the surface structure often can only improve but not prevent from surface sticking of foreign materials. It is known that surface wave would be much stronger and active than merely passive surface coating in cleaning of the surface. But most of the cleaning apparatus involved a complicated system (U.S. Pat. No. 4,007,465, System for self-cleaning ink jet head, K. C. Chaudhary), and may not a simple adaptation for the said flow sensors.

It would be desirable, nonetheless, that a simple flow sensor with a high-performance in flow measurement yet a self-cleaned surface for reliability can be constructed. It is further desirable that the sensors shall be easily manufactured for a mass production. To this end, it is known that porous silicon can emit acoustic wave with strength (Characteristics of thermally induced ultrasonic emission from nanocrystalline porous silicon device under impulse operation, by Y. Watabe et al., Jap. J. Appl. Phys. Vol. 45, 3645-47). Alternative approach of the surface wave can be realized using an active capacitive force generated surface vibration. Such a structure can be simply constructed (U.S. Pat. No. 6,781,735, Fabry-Perot cavity manufactured with bulk micro-machining process applied on supporting substrate, Huang, et al.) Likewise, it is desirable to construct the mass flow sensor with self-cleaned surface by combining the mass flow sensor apparatus and surface acoustic emission or the surface vibration configuration.

SUMMARY OF THE INVENTION

It is therefore an object of the present invention to provide an apparatus and a method of fabricating a MEMS thermal mass flow sensor with the superior performance in flow measurement while maintaining a robust self-cleaned surface. In the present invention, the porous silicon layer shall be modified to form the acoustic surface wave emitter for the self-cleaning capability while functioning as the heat isolation and the robust cushion for the sensing elements. In an alternative approach, the sensing elements shall be fabricated on a membrane below which is a cavity where a capacitive force could be applied such that the vibration at the time of desire shall remove foreign materials deposited on the surface of the sensing elements.

In the present preferred embodiments, the integrated micromachined silicon thermal flow sensors employed the principles of both anemometry and calorimetry on a substrate with the capability of acoustic wave emission or membrane vibration for removal of foreign material on the sensing element surface are depicted. More specifically, the sensing elements of the flow sensors mainly comprise four serpentine-shape thermistors which are made of same thin film materials. One of the thermistors is built as reference thermistor to monitor the ambient temperature while another one of the thermistors is functioned as heater thermistor. In the preferred embodiments, the resistance of reference thermistor is several times higher than the heater's. The heater thermistor is elevated to a constant temperature higher than the ambient temperature. A Wheatstone bridge circuit consisting of the heater and reference thermistors is designed to achieve constant temperature control of heater thermistor. The other two thermistors are disposed to the upstream and downstream of heater thermistor in an either symmetrical or asymmetrical configuration to the center of the heater thermistor. Since the moving fluid continuously carries heat away from the heater thermistor, and thus to change the temperature distribution around the adjacent region of heater thermistor. The temperature difference between the upstream and downstream area of heater thermistor is hence measured by the temperature sensing elements. The output signal is normally recorded using a Wheatstone bridge circuit, in which the downstream and upstream sensing elements comprise two of its four branches. Various materials with high TCR (temperature coefficient of resistance) property such as Pt, Au, SiC, and TaN could be the candidates for temperature sensing elements.

In the prior arts using thermistors as the sensing elements require a heat isolation that is achieved via forming a cavity beneath a suspending membrane on which the thermistors are deposited. The cavity was formed on a silicon substrate and it was processed usually by wet chemical etch such that the bottom of the cavity is an upside down pyramid due to preferable etch of the atomic structure of the silicon. The thermal conductivity property of air is about 0.024 W/m/K at ambient. In the present disclosed invention, the suspending membrane was formed by a silicon nitride film of 0.3~1.5 µm on top of a conductive polycrystalline silicon film of 0.3~0.5 µm that serves as one of the electrode of the said capacitor. The cavity underneath the membrane shall be formed via a standard spin-on glass (SOG) process combining with the surface micromachining using the technology previously disclosed by the same assignee (U.S. Pat. No. 6,620,712, Defined sacrificial region via ion implantation for micro-opto-electro-mechanical system applications, Huang et al.), such that the cavity bottom surface shall be flat and another capacitor surface can be formed by adding a silicon oxide or silicon nitride film of 0.3~0.5 µm first on the silicon substrate and the conductive polycrystalline silicon thin film of 0.3~0.5 µm on top of the said silicon oxide or silicon nitride. These two polycrystalline silicon films are preferably formed by low pressure chemical vapor deposition (LPCVD) such that the proper stress can be managed making the both surface of the said capacitor flat. These two polycrystalline silicon films could become conductive by doping them with either n- or p-type with dopants such as phosphors or boron. Thereby they shall serve as the electrodes of the said capacitor to drive the vibration of the membrane. The vibration of the membrane can be achieved by applying an alternative voltage or pulse to the said capacitor with a desired frequency that shall have the strength to remove foreign materials on the surface of the sensing elements.

In another approach, and yet would be a preferable embodiment, that a porous silicon device capable of emitting acoustic wave was fabricated beneath the membrane on which the sensing elements are disposed. A pattern of porous silicon is produced in the surface of a p-type silicon substrate by performing an electrochemical anodization of silicon in a hydrofluoric acid (HF) electrolyte. The porous silicon in current invention is generated by a selective formation method. The porous silicon with a porosity of porous silicon of 50% is known to have a low thermal conductivity of ~0.2 W/m/K that is about 700 times lower than that for the substrate silicon (On the optical and thermal properties of porous silicon, by J. M. Devi et al., NDT.net Vol. 11, No. 6 2006). Whereby use of porous silicon for the purpose of thermal isolation become advantageous.

Different from the other thermistors in the device, since the reference thermistor needs good thermal conduction to the substrate, therefore any porous silicon layer underneath the reference thermistor is unfavorable. The selective formation method can greatly reduce the chance for metal interconnection breakage during device fabrication process. This is because a very abrupt and deep recess, especially in the case of 100~200 µm thickness of porous silicon, could be created for patterning the porous silicon through dry/wet etching afterwards. On the other hand, the selective formation of porous silicon would be able to avoid the generation of such abrupt recess on wafer surface.

In the disclosed invention, silicon nitride is applied as the hard mask for the selective formation of porous silicon. The characters that determine the porosity of porous silicon layers including the substrate doping level, anodizing current density, and the concentration of hydrofluoric acid (HF) electrolyte. In general situation, the porosity of porous silicon is increased with increasing current density, and it is reversely proportional to the substrate doping level and HF electrolyte concentration. The LPCVD silicon nitride is most preferred than the films obtained from other deposition methods since in this method its etching resistance to HF acid is upon highest. As the reference thermistor is aimed to measure the environment temperature, hence it needs good thermal conductivity to the substrate bottom. Since the insulation layer (silicon nitride) underneath the reference thermistor is no longer used as part of the membrane structure, therefore it could be as thin as possible. It is thus to increase the thermal conductivity of reference thermistor to substrate, which could facilitate to greatly reduce the temperature effect and enhance the thermal response of device.

Referring to the papers of Asamura et al. (Intensifying Thermally Induced Ultrasound Emission, Proc. 19th Sensor Symposium IEEJ, Tokyo, 2002) and the paper of Watabe et al. an ultrasonic acoustic wave is feasible to produce from the flow sensor structure of current invention as a self-cleaning energy source. The thermally induced ultrasound emission device is normally including three parts in the structure: (1) a heat conductive base, such as silicon wafer (2) heat insulation layer: such as porous silicon (3) electrically conductive film: such as platinum (Pt). The ultrasonic wave is induced by the electrical pulse applied on the conductive film. The relationship between the ultrasound pressure amplitude (P) and the surface temperature fluctuation ($\Delta T_{Peak}$) could be represented as $$P = \Delta T_{Peak} \times \frac{A\sqrt{2\pi/t}}{K(x)},$$

$$K(x) = \frac{S}{2vtx}, \quad A = \sqrt{\frac{\gamma \alpha_A}{C_A} \frac{P_A}{vT_A}}$$

where the t and S are the input pulse width and the area corresponding to the ultrasonic emission. The constants v, $\alpha_A$, $C_A$, $P_A$, and $T_A$ are the sound velocity, the thermal conductivity, the heat capacity per unit volume of air, the atmospheric pressure, and the room temperature, respectively, and $\gamma$ is the specific heat ratio as $c_p/c_v \approx 1.4$.

Another advantage gained from the porous silicon embodiment is the process simplification for device fabrication. That includes the deletion of process steps on front side protection layer deposition and removal before and after the backside bulk etching step. Avoiding the vulnerable and fragile membrane structure also benefits the device from dicing process since the yield and throughput can be significantly increased. It is apparent that the damage and failure situations for sensor during handling and operation had been cut down to a minimum base.

All the thermistors on device are encapsulated with a 0.3~0.5 μm thick dielectric film as passivation layer. Above this dielectric film, a thin layer of fluorocarbon coating is deposited onto whole device to make the device surface become hydrophobic and low surface energy. The thin hydrophobic fluorocarbon coating is designed to prevent the stiction issues of alien particles or debris or liquid materials onto device surface, which could significantly degrade the device operation.

BRIEF DESCRIPTIONS OF THE DRAWINGS

DETAILED DESCRIPTION OF THE PREFERRED EMBODIMENTS

Figure 1:
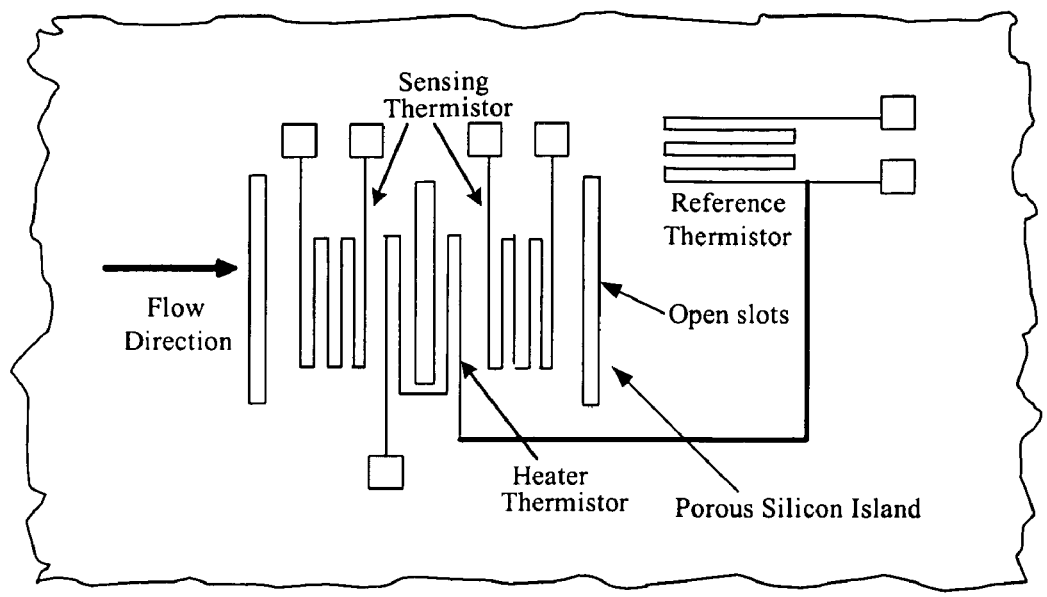
FIG. 1 Illustrates the top view of a preferred sensor topology.

FIG. 1 illustrates a top view of preferred sensor topology. The reference thermistor is aimed to measure the ambient temperature. The ambient temperature signal provides the feedback to a closed-loop heater thermistor control circuit. The control circuit is designed to keep the heater temperature constantly above the ambient temperature. The upstream and downstream thermistors besides the heater thermistor are worked as temperature sensing elements.

The working principle behind the fluid speed measurement in a fluid passage is primarily based on anemometry and calorimetry. Since the heater thermistor is operating under constant temperature mode, two major embodiments in the present invention are included:

(1) The heater thermistor and reference thermistor are working together as an MEMS constant temperature mode anemometer, which could measure a large dynamic flow rate.

(2) The heater thermistor and the two downstream/upstream thermistors comprise a calorimetric mode flow sensor, which could measure a lower dynamic flow rate with a better accuracy than feature (1).

(3) Consequently, combined the features (1) and (2), a large dynamic range (high turn-down ratio) flow sensor can be accomplished.

The open slots on the porous silicon island are designed to isolate the lateral heat conduction through the passivation dielectric films which is crucial to the measurement accuracy.

Figure 2:
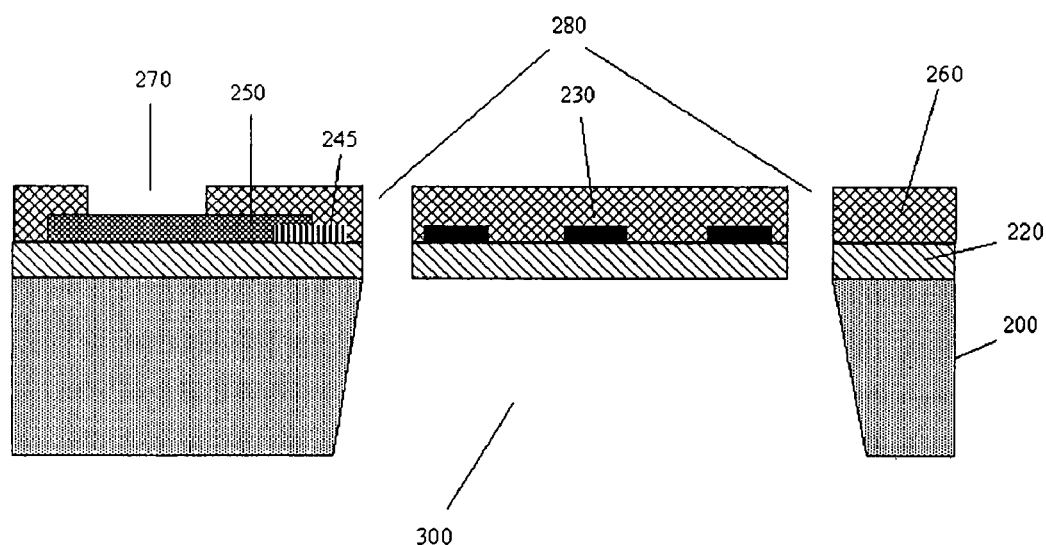
FIG. 2 Illustrates a MEMS thermal mass flow sensor of prior art.

FIG. 2 depicts a side view for a pictorial illustration of a conventional MEMS thermal flow sensor (prior art). A suspending membrane structure is illustrated.

Figure 3A:
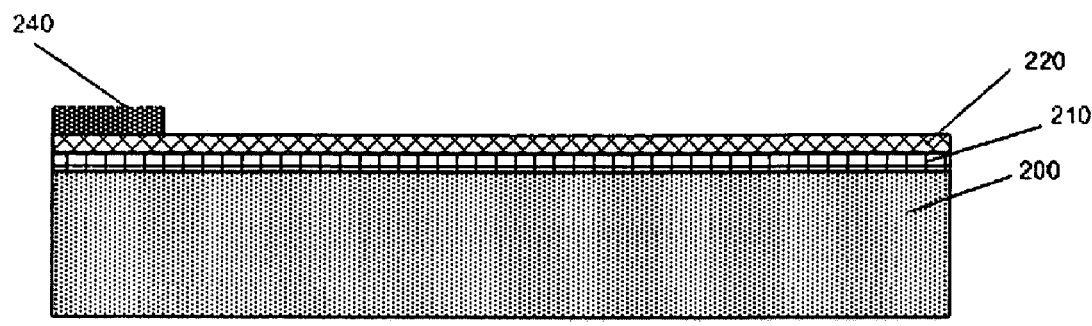
FIG. 3 Illustrates the present invention of a thermal mass flow sensor fabricated on a cavity that can generate vibration via capacitive force for self-cleaning of surface foreign materials at a time of desire.

FIG. 3(a) through (h) illustrates the detailed micro-fabrication process of one of the preferred embodiments. Referring to FIG. 3(a), a silicon nitride film, 210, of 0.1~0.3 μm is first deposited on silicon substrate, 200, preferably using LPCVD. A conductive (doped with either phosphorus or boron) polycrystalline silicon film, 220, with a thickness of 0.1~0.5 μm is subsequently deposition using LPCVD process followed by the deposition of metal electrode, 240.

Figure 3B:
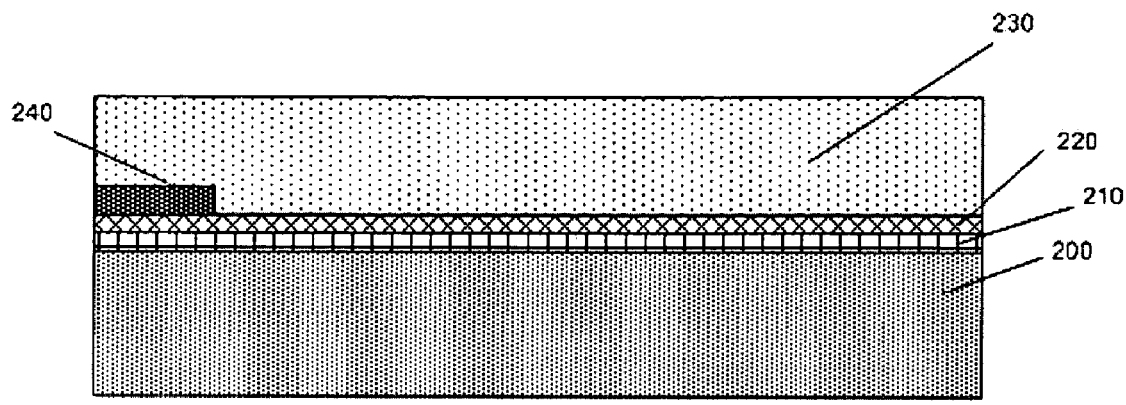
Figure 3C:
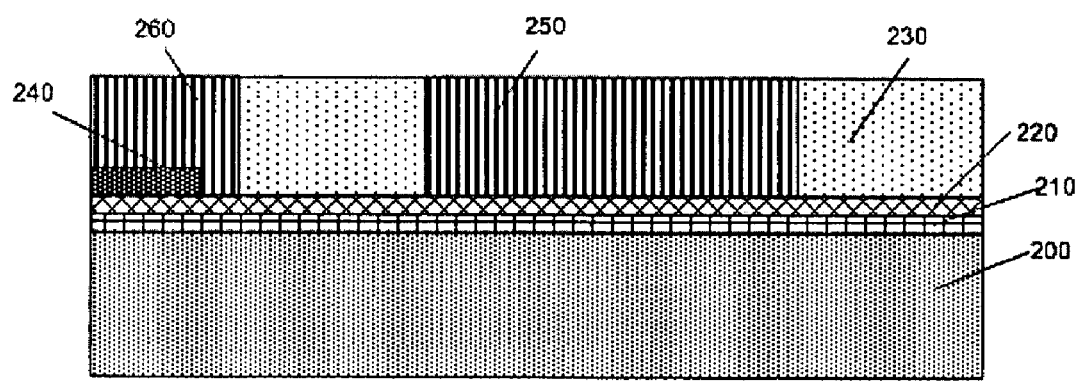
Figure 3D:
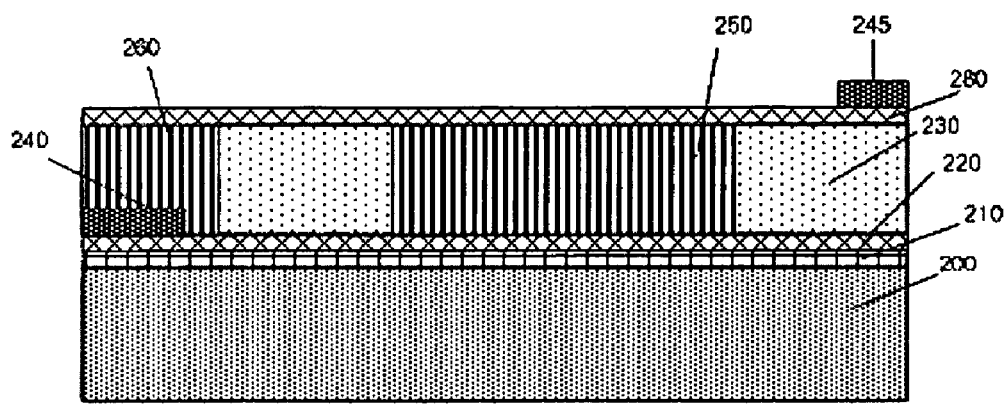

A standard spin-on glass (SOG) process is then followed to construct the cavity support, 230, with a thickness preferably in the range of 0.8~5.0 μm (FIG. 3(b)).

In view of FIG. 3 (c), doping the glass either using ion implantation or conventional doping process to define the sacrificial area, 250 and 260, can significantly enhance the etch rate of the glass using hydrofluoric acid. The detailed doping process can be found in U.S. Pat. No. 6,620,712 as previously described.

The upper conductive layer, 280, of the said cavity is preferably made by polycrystalline silicon film, 280, with a thickness of 0.1~0.5 μm. This is followed by the deposition of the electrode 245. (FIG. 3(d))

Figure 3E:
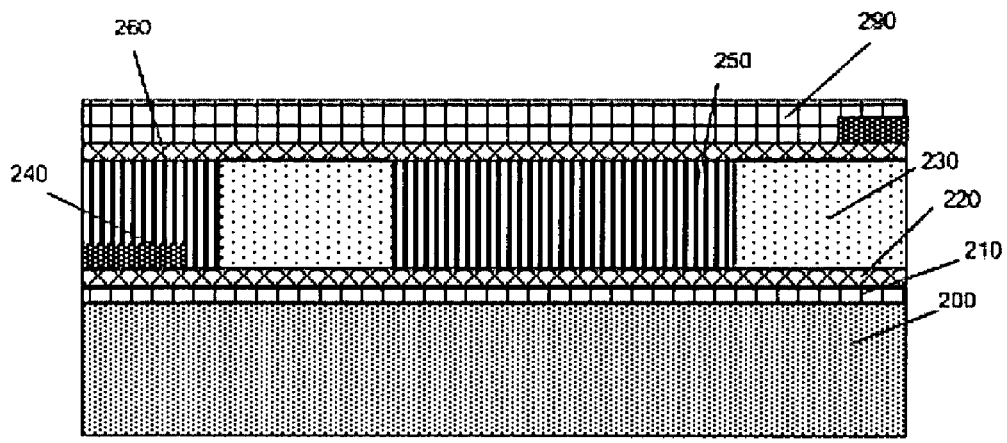

In view of FIG. 3(e), the sensor membrane is preferably made by LPCVD silicon nitride film, 290, with a thickness of 0.8~2.0 μm.

Figure 3F:
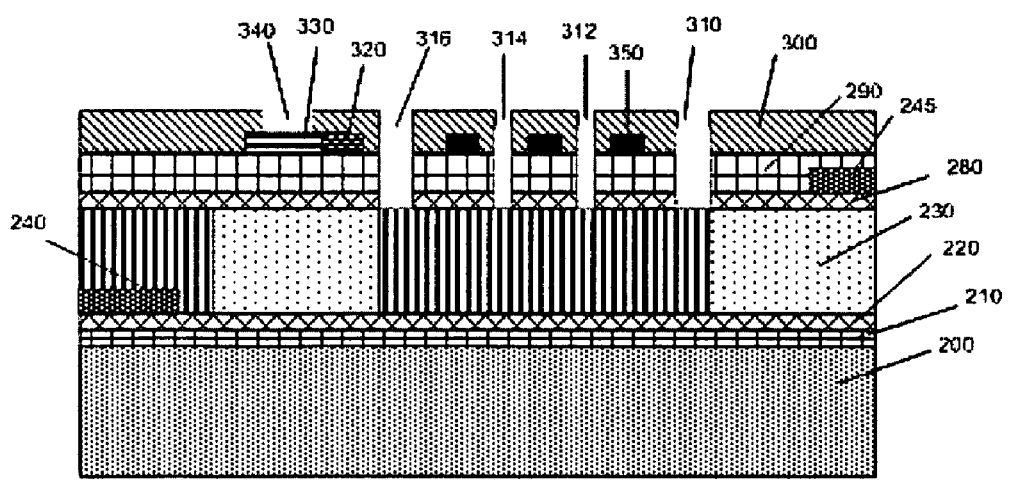

Subsequently is the process of making mass flow sensors for which the detailed process can be found in US Pat. Pub. App. No. 2007-0011867. As shown in FIG. 3(f), it includes deposition of sensing elements 350, fabrication of reference thermistor 320, deposition of bonding pads 330, etch open for pads opening 340 as well as open of isolation openings 310, 312, 314, and 316.

Figure 3G:
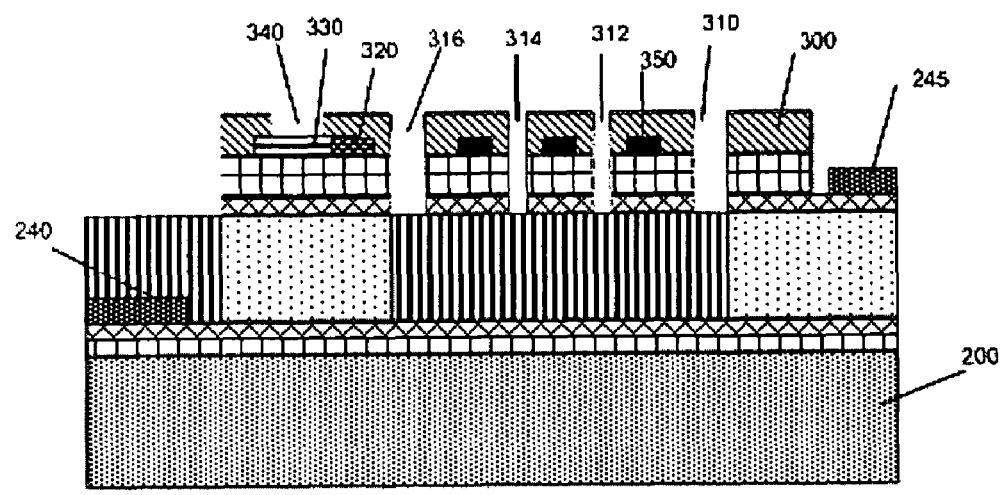

In view of FIG. 3(g), either dry or wet etch can be performed to open the path to the upper capacitor cavity electrodes 245

Figure 3H:
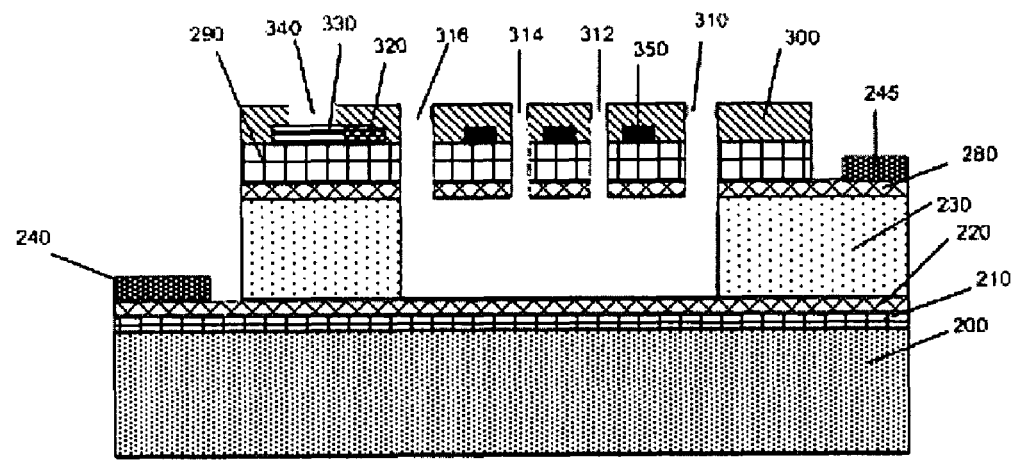

Finally, as shown in FIG. 3(h), hydrofluoric acid etch of the sacrificial glass will remove the glass in the defined cavity and open the path to the lower electrode, 240, and consequently conclude the fabrication process.

In this preferred embodiments, the thermal mass flow sensing elements are well isolated with the air while the voltage applied to the upper and lower electrodes of the cavity shall excite the vibration modes of the cavity causing the membrane to vibrate such that any foreign materials on the surface could be removed.

Figure 4:
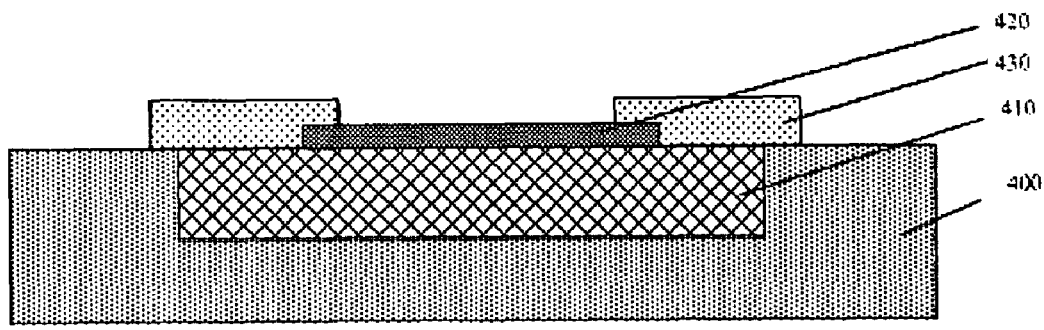
FIG. 4 Illustrates the basic structure of a thermally induced ultrasound emitter from porous silicon on silicon substrate.
Figure 5A:
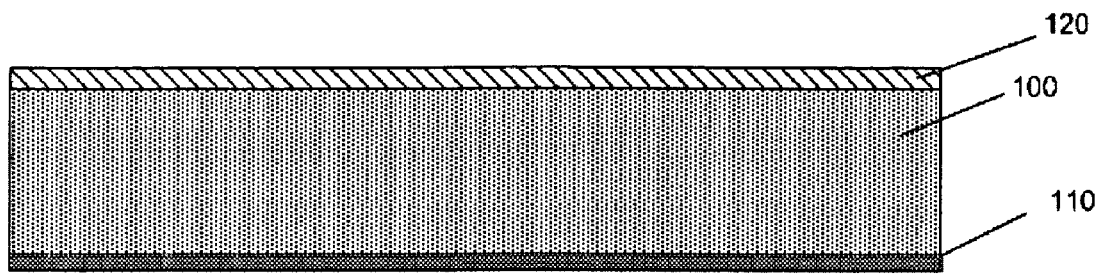
FIG. 5 Illustrates a process for forming a new type of MEMS thermal mass flow sensor according to the preferred embodiment of the present invention.
Figure 5B:
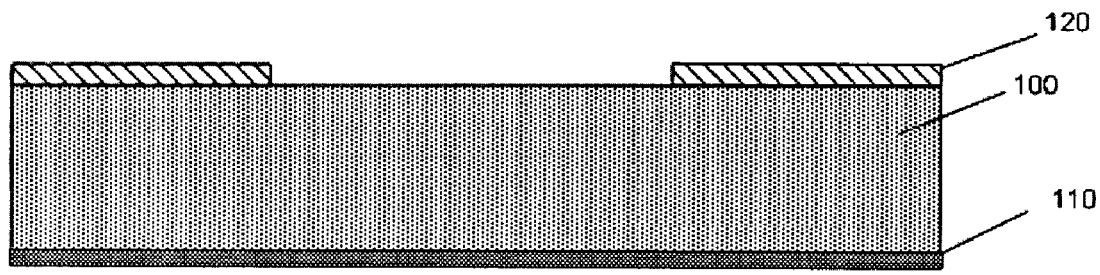
Figure 5C:
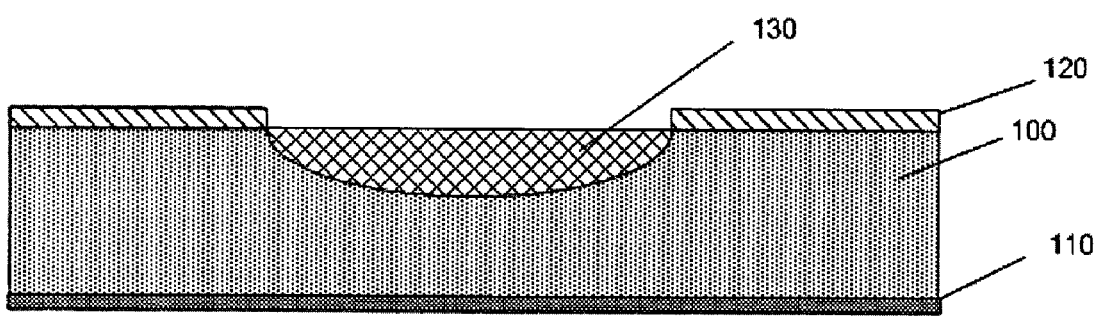
Figure 5D:
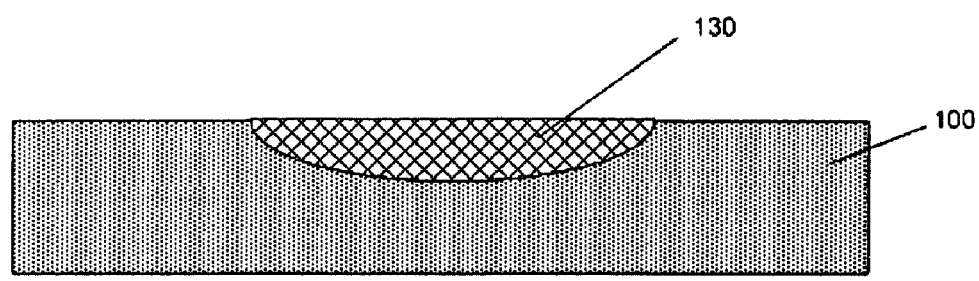
Figure 5E:
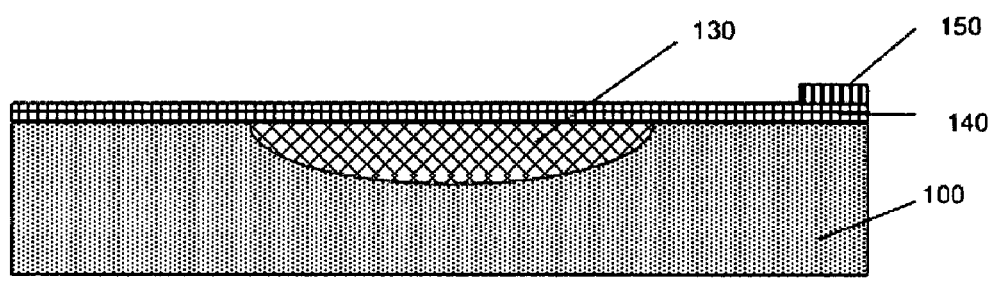
Figure 5F:
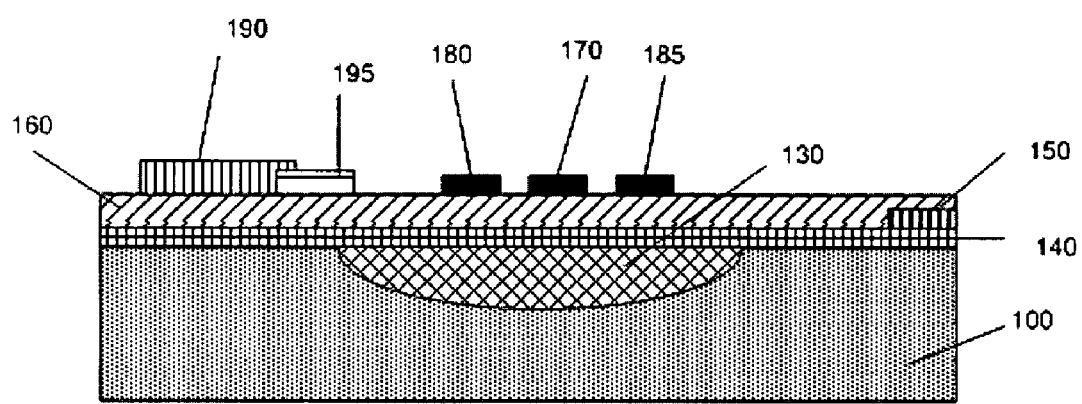
Figure 5G:
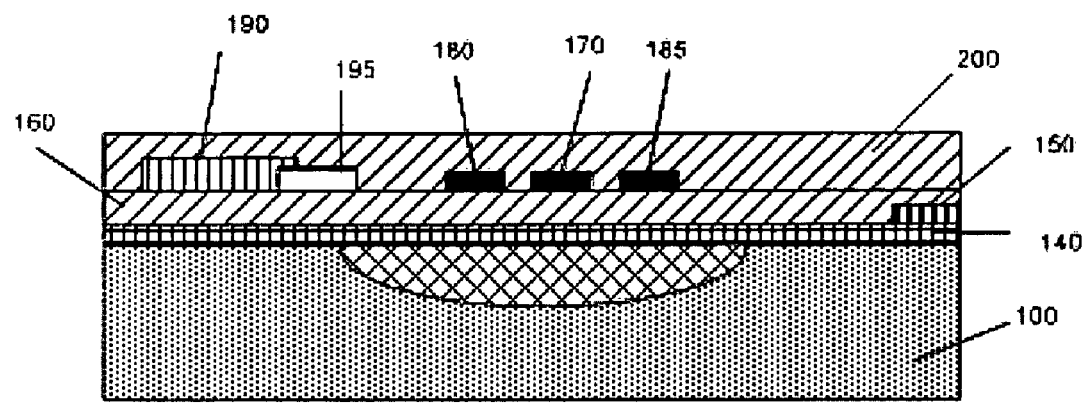
Figure 5H:
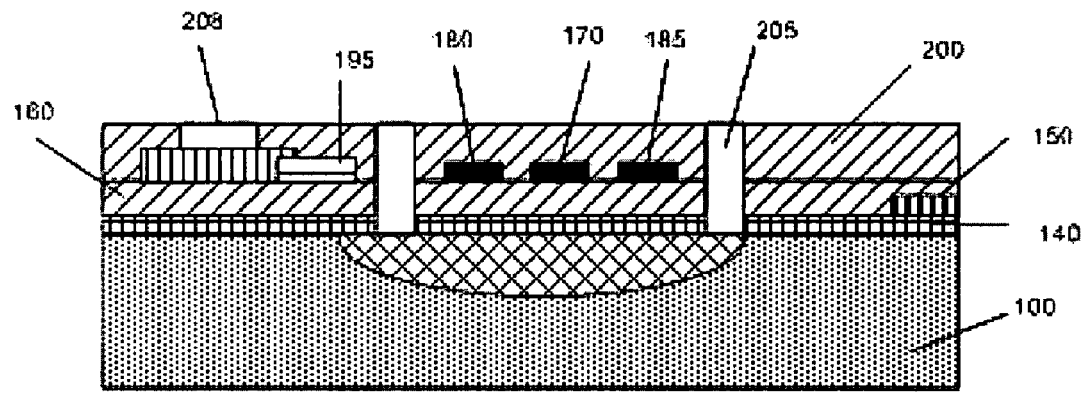
Figure 5I:
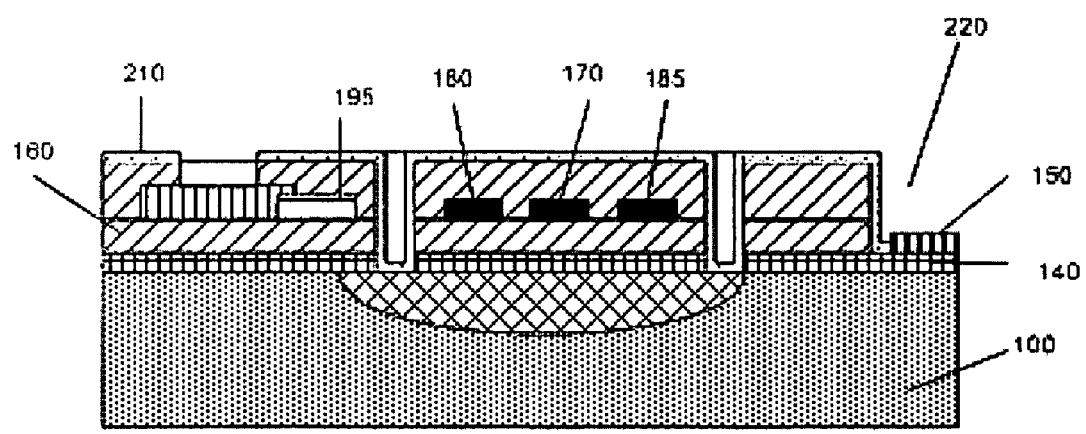

FIG. 4 illustrates the basic structure of a thermally induced ultrasound emitter from porous silicon 410 on silicon substrate 400. Due to the excellent thermal insulation property of porous silicon 410, temperature fluctuations induced by electrical high frequency pulse signals at the top surface are promptly transmitted into air as sound pressure. The electrical pulse signals are applied to the metal heater layer 420 through the electrodes 430. Since there are no moving parts in the ultrasonic emitter, therefore it would not affect the measurement accuracy and repeatability of flow sensor.

From FIG. 5 (a) through FIG. 5 (i), the figures demonstrate a process for forming a new type of MEMS thermal flow sensor with self-cleaning capability according to the preferred embodiment of the present invention.

Referring to FIG. 5 (a), a LPCVD silicon nitride layer 120 is formed on both sides of the silicon substrate 100. After the bottom side of the nitride layer is removed, an aluminum layer 110 is deposited thereafter on the bottom of the wafer as ohmic contact electrode for electrochemical anodization.

In view of FIG. 5 (b), the first mask is used to pattern the silicon nitride as the open window for selective formation of porous silicon. The silicon wafer is then placed in an anodizing chamber filled with prepared electrolyte. The electrolyte is a mixture of hydrofluoric acid (HF), nitric acid ($HNO_3$), and isopropyl alcohol (IPA) with certain ratio. In order to achieve high porosity (higher than 50%) of porous silicon, a p-type silicon wafer with resistivity of 1~10 Ω·cm is preferred. The current density is set up in the range of 50 to 150 mA/cm$^2$. It would take about 30 min of anodization to attain approximate 200 μm thick of porous silicon as shown in the 130 region of FIG. 5 (c).

After stripping away the front side silicon nitride and the bottom side aluminum (as shown in FIG. 5 (d)), a conductive polycrystalline silicon film, 140, with a thickness of 0.3~0.8 μm is deposited via LPCVD and doped with either phosphorus or boron in the front side of wafer followed by deposition of electrode, 150, formed by aluminum or gold or platinum (FIG. 5 (e)).

In view of FIG. 5 (f), a silicon nitride film, 160, with a thickness of 0.2~0.8 μm is deposited on top of the polycrystalline silicon film. The heater thermistor 170, temperature sensing thermistors 180 and 185, and reference thermistor 195 are all formed and patterned by the film deposition and second photo mask process. The preferred thermistor materials are those with high temperature coefficient of resistance (TCR) such as platinum (Pt), gold (Au), silicon carbide (SiC), and tantalum nitride (TaN). Subsequently, a third masking and patterning procedure is performed to remove the portions of interconnection metal layer and form the interconnection circuit and the bonding pads 190. Subsequently referring to FIG. 5(g), a passivation layer 200, said dielectric thin film, for the overall processed substrate structure is deposited.

In the FIG. 5 (h), a patterning procedure is performed to define the open-slots, 205, in the membrane as well as the opening in the bonding pads, 208.

In the last step of process (see FIG. 5 (i)), a very thin fluorocarbon coating, 210, (5~15 nm) such as Teflon or Teflon-like film is deposited onto the surface of whole device by plasma enhanced deposition process. Since this thin passivation coating is hydrophobic and with low surface energy property, hence it could significantly reduce the sensor surface sticking issues of alien particles and debris within the flow media. This coating layer is especially efficient to prevent the sticking of dust and moisture mixture onto device surface. Since the fluorocarbon film has low thermal conductive property, hence it should be kept as thin as possible to remain the original functionality of device and to avoid the difficulties for wire bonding. Finally, dry or wet etch to open the path, 220, to the electrode that is used to generate acoustic wave is performed to conclude the fabrication.

Alternatively applying a high frequency pulse signal (about 1 μs width) at a sampling time of 20 msec to the heater and sensor thermistors, an ultrasonic wave with a ~1000 Pa acoustic pressure could also be generated to clean up the active surface region at a time of desire.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

We claim:

1. A micromachined thermal mass flow sensor with self-cleaning components comprising:
    a suspending membrane with an resonant cavity underneath;
    a heater thermistor being disposed on top of said suspending membrane;
    an upstream temperature sensing thermistor being disposed on top of said suspending membrane;
    a downstream temperature sensing thermistor being disposed on top of said suspending membrane;
    a reference thermistor being disposed on top of a region of non-suspending membrane;
    a top electrode being formed by in serial connecting said heater thermistor, said upstream temperature sensing thermistor, and said downstream temperature sensing thermistor by an external circuit; and
    a bottom electrode being formed by a doped polysilicon layer or a metal layer which is disposed on a bottom surface of said resonant cavity;
    wherein the self-cleaning components of said thermal mass flow sensor generate a mechanical vibration on said suspending membrane by modulating an electric voltage between said top and bottom electrodes of said resonant cavity such that foreign particles are detached and blown away by a gas flow from the top surface of said suspending membrane.

2. The micromachined thermal mass flow sensors with self-cleaning components of claim 1 wherein
    said modulating electric voltage is a pulse voltage or a sinusoidal wave function with a desired frequency.

3. A micromachined thermal mass flow sensor with self-cleaning components comprising:
    a selectively formed porous silicon island with a dielectric film on top as electric insulation layer being provided on a silicon substrate as a thermally isolated area for flow sensor operation;
    a heater thermistor being disposed on a top surface of said porous silicon island;
    an upstream temperature sensing thermistors being disposed on the top surface of said porous silicon island;
    a downstream temperature sensing thermistors being disposed on the top surface of said porous silicon island; and
    a reference thermistor being disposed on a region of said silicon substrate other than said porous silicon island;
    wherein the self-cleaning components of said thermal mass flow sensor actuate as thermal source for an ultrasonic acoustic wave emitter, said heater thermistor and said temperature sensing thermistors by introducing a pulsed voltage source to elevate a temperature of said heater thermistor and said temperature sensing thermistors.

4. The micromachined thermal mass flow sensor with self-cleaning components of claim 3 wherein a silicon nitride layer is deposited on top of said silicon substrate and patterned as a hard mask for selective formation of said porous silicon.

5. The micromachined thermal mass flow sensor with self-cleaning components of claim 3 wherein four open slots on said dielectric film around each side of perimeters of said porous silicon island are formed to isolate a lateral heat conduction from said heater thermistor to said silicon substrate.

6. The micromachined thermal mass flow sensor with self-cleaning components of claim 3 wherein said self-cleaning components include a thermally induced unitrasonic acoustic wave emitter that generates an ultrasonic energy wave on the front surface of said porous silicon island.

7. The micromachined thermal mass flow sensor with self-cleaning components of claim 6 wherein said thermally induced ultrasonic acoustic wave emitter is formed by combining said porous silicon island, said dielectric film, and said thermistors on the top surface of said porous silicon island.

8. The micromachined thermal mass flow sensor with self-cleaning components of claim 7 wherein said generated ultrasonic energy wave agitates foreign particles such that they are detached and blown away from the top surface of said porous silicon island which is an active area for flow sensor operation.

9. The micromachined thermal mass flow sensor with self-cleaning components of claim 3 wherein said porous silicon island is selectively formed as a thermally isolated area on said silicon substrate by electro-chemical anodization.

\* \* \* \* \*